United States Patent
Fischer

[11] Patent Number: 5,180,409
[45] Date of Patent: Jan. 19, 1993

[54] HOT-GAS-FILTERING FABRIC OF SPACED UNCRIMPED SUPPORT STRANDS AND CRIMPED LOFTY FILL YARNS

[75] Inventor: Edward M. Fischer, White Bear Lake, Minn.

[73] Assignee: Minnesota Mining and Manufacturing Company, St. Paul, Minn.

[21] Appl. No.: 827,994

[22] Filed: Jan. 30, 1992

[51] Int. Cl.$^5$ ............................................. B01D 46/00
[52] U.S. Cl. ........................................ 55/486; 55/523; 55/527; 55/DIG. 30; 139/420 B; 139/420 C
[58] Field of Search ................. 55/486, 497, 499, 523, 55/527, DIG. 30; 139/383 A, 420 B, 420 C, 425 R

[56] References Cited

U.S. PATENT DOCUMENTS

| | | | |
|---|---|---|---|
| 4,066,106 | 1/1978 | Graham | 139/420 C |
| 4,205,971 | 6/1980 | Abthoff et al. | 55/DIG. 30 X |
| 4,261,392 | 4/1981 | Westhead | 139/420 C |
| 4,324,572 | 4/1982 | Erdmannsdorfer et al. | 55/DIG. 30 X |
| 4,491,517 | 1/1985 | Janovac | 139/425 R |
| 4,543,113 | 9/1985 | Forester et al. | 55/523 X |
| 4,605,585 | 8/1986 | Johansson | 139/383 A |

FOREIGN PATENT DOCUMENTS 3731766 5/1989 Fed. Rep. of Germany.

OTHER PUBLICATIONS

Hardenberg et al., "Experiences in the Development of Ceramic Fiber Coil Particulate Traps," *SAE Technical Paper Series,* International Congress and Exposition, Detroit, MI, Feb. 23-27, 1987, pp. 67-78.

Primary Examiner—Charles Hart
Attorney, Agent, or Firm—Gary L. Griswold; Walter N. Kirn; Gerald F. Chernivec

[57] ABSTRACT

A fabric for filtering particulate matter from a stream of hot gases, e.g., from a diesel engine, has an unknotted weave of flexible, incompressible, uncrimped, spaced support yarns and flexible, lofty, fully crimped, fill yarns. During the weaving process, the fill yarns are pulled tightly against the support yarns so that they do not slip or shift. For greater assurance of good filtering, a filter employs multiple layers of the fabric, with the support yarns of each layer extending orthogonally to those of adjacent layers. For uses involving prolonged exposure to high temperature, both the support yarns and fill yarns can be continuous-filament ceramic yarns such as alumina-boria-silica yarns. For lower temperatures, the yarns can be primarily glass.

21 Claims, 2 Drawing Sheets

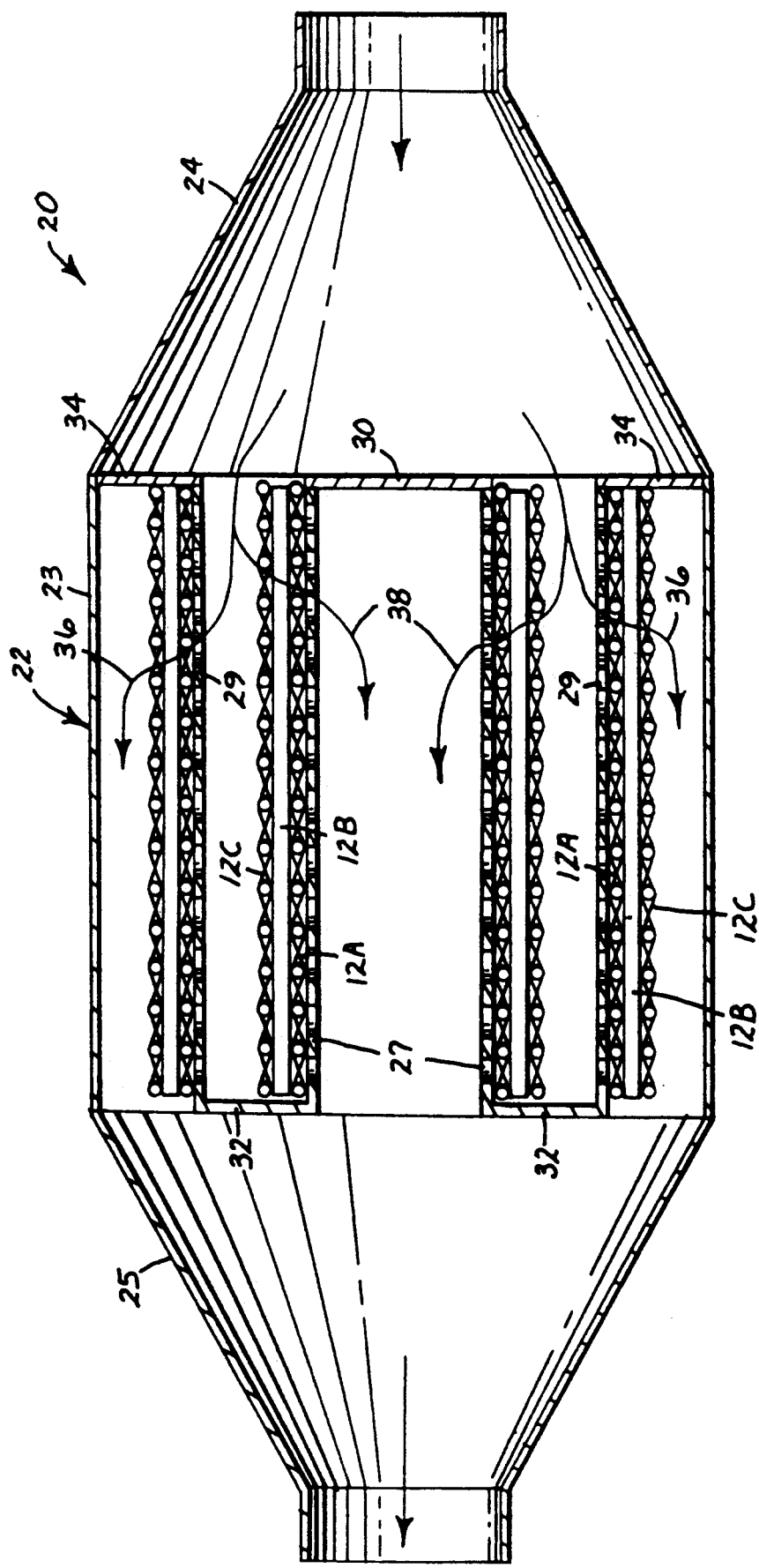

HOT-GAS-FILTERING FABRIC OF SPACED UNCRIMPED SUPPORT STRANDS AND CRIMPED LOFTY FILL YARNS

BACKGROUND OF THE INVENTION

1. Field of the Invention

The invention concerns filters that remove particulates from streams of hot gases such as from exhausts of fossil fuel furnaces, coal-gasification plants, and internal combustion engines. The invention is especially concerned with the need to remove particulate matter from exhausts of diesel engines.

2. Description of the Related Art

As part of a worldwide effort to protect the environment, concerted efforts are underway to reduce the quantity of soot and other particulate matter emitted into the atmosphere by the burning of fossil fuels. For example, particulate emissions from coal-burning furnaces, e.g., of electric power plants, have long been a primary cause of environmental concern. Efforts also are being made to reduce the emission of soot from the exhausts of diesel engines and coal-gasification plants.

It is known that soot can be removed from hot exhaust gases by passing such gases through filter fabrics. One such filter fabric, as disclosed in coassigned U.S. Pat. No. 4,543,113 (Forester et al.), is made from a woven ceramic fiber which maintains its integrity for prolonged periods at temperatures up to at least 1150° C. and for at least short periods up to at least 1400° C. This filter fabric preferably is employed as a seamless, tubular filter which can be cleaned periodically by a reverse purge of air. Also illustrated is a flat filter having a flat piece of the fabric supported in a frame. Preferably, the ceramic fiber fabric comprises continuous alumina-boria-silica fibers (such as are sold under the trademark NEXTEL TM 312 from the 3M Co.).

Although little used commercially to date, a variety of diesel particulate traps have been described in the prior art. Most employ a plurality of rigid, perforated hollow tubes on which ceramic yarn is wound. In Offenlegungsschrift No. DE 37 31 766 (Buck), laid open 30 Mar. 1989, perforated tubes are covered with a knitted sleeve of ceramic yarn of alumina-boria-silica fibers or wound with a length of the knitted fabric or, as shown in FIG. 11, a spirally wound length of the knitted fabric is stuffed into a canister.

In some diesel particulate traps, the perforated hollow tubes extend side-by-side, and in others, the tubes are concentric. Side-by-side, rigid, perforated hollow tubes (called "support pipes") are shown in U.S. Pat. No. 4,324,572 (Erdmannsdoerfer). There, threads of spun silicon dioxide or silica fiber are wound on each of the tubes to provide filtering elements. Each tube is blocked at the exhaust inlet, while channels between the tubes are blocked by a wall at the outlet, thus forcing the exhaust to pass through the filtering elements.

Hardenberg et al., "Experiences in the Development of Ceramic Fiber Coil Particulate Traps," *SAE Technical Paper Series*, International Congress and Exposition, Detroit, Mich., Feb. 23–27, 1987, pp 67–70, reports testing of a ceramic fiber coil trap made using threads of endless ceramic fibers which are twisted together. The threads are wound crosswise onto perforated hollow tubes to provide filtering elements. Unfortunately, the crosswinding process is tedious and slow, so that such a diesel particulate trap may be too expensive for widespread commercial use.

Any filter that removes particulate matter from hot exhaust gases should not substantially increase back pressures and thus should not substantially interfere with filtration efficiency. Nevertheless, known diesel particulate traps tend to increase back pressures to such an extent that they unduly increase fuel consumption. They also tend to be inefficient and to have short useful lives, and if regeneratable, would require undesirable frequent regeneration cycles.

SUMMARY OF THE INVENTION

The invention provides a fabric that maintains its integrity at high temperatures and can be used for filtering particulate matter from a stream of hot gases. The novel fabric can trap large quantities of soot before experiencing significantly increased back pressure. Because of these properties, the novel filtering fabric should be especially useful in a diesel particulate trap which itself is believed to be novel. The novel fabric also is useful for filtering particulates from exhausts of other internal combustion engines, as well as from exhausts of fossil fuel furnaces and coal-gasification plants.

Briefly, the filtering fabric of the invention is an unknotted weave of flexible, substantially incompressible, substantially uncrimped, spaced support strands and flexible, lofty, substantially fully crimped fill yarns that are pulled tightly against the support strands.

The term "yarn" is used herein to encompass any bundle of ends, twisted or untwisted, i.e., bundle of ends that have been twisted together as well as a bundle that has not been twisted together. (An end is defined herein as a plurality of twisted or untwisted filaments, even though a bundle of untwisted ends is often called a "roving" in the prior art).

By "substantially incompressible" is meant that the support strands maintain their shape and diameter when the lofty fill yarns are pulled tightly against the support strands. Preferably, the support strands are yarns that are rendered substantially incompressible by being made from a plurality of small glass or ceramic filament ends (preferably from 3 to 8 ends/bundle and from 300 to 1600 filaments/end) that are uniformly twisted together, preferably having from 0.4 to 3 twists/cm, after which a plurality of those intertwisted bundles (preferably from 2 to 6) are twisted together in the opposite direction at the same number of twists/cm.

By "crimp" is meant the generally sinuous form taken up by a yarn during the weaving action of producing a fabric.

By "lofty" is meant a yarn which when unstressed has a void volume of at least 75%. The void volume of a yarn can be calculated by using a graduated microscope to measure the nominal diameter (D) and a scale to measure the mass (M) of a length (L) of the yarn. The void volume (VV) is then obtained from the following equation:

$$VV = 1 - \frac{M/\rho}{\pi L D^2 / 4}$$

wherein $\rho$ is the bulk density of the yarn.

A yarn can be made lofty by air-texturizing. When the yarn is a continuous-filament yarn, the texturizing causes loops of the continuous filaments to extend outwardly, without substantial breakage. A spun staple glass or ceramic yarn also can be texturized, again substantially without breaking filaments.

The D of a texturized yarn is the diameter of a cylindrical envelope to which the loops extend, which envelope bridges any valleys at the surface of the yarn and so encompasses voids at those surfaces.

To enhance texturizing, individual ends of the fill yarns should not be highly twisted, i.e., they preferably have less than 2 twists/m, and the ends should not be tightly twisted together, i.e, preferably having no more than one twist/cm. When the ends are twisted together, texturizing also is enhanced by employing only a few ends per yarn, preferably two or three.

For optimum filtering efficiency, while keeping back pressures low, the fill yarns should be texturized to a void volume of at least 85%, more preferably at least 95%. To keep back pressures low, the fill yarns preferably are spaced from each other, but the outermost fibers of highly texturized fill yarns can be intermeshed without appreciably increasing back pressures. When the fill yarns are not intermeshed, a filter should employ multiple layers of the novel fabric.

For convenience of manufacture, the support strands preferably are the warp, and the fill yarns are the weft of the novel fabric and are pulled tightly against the support strands during the weaving process. By being pulled tightly against the support strands, the fill yarn is flattened where it contacts a support strand, thus helping to prevent the fill yarn from slipping or shifting, especially when the fill yarn is flattened at each support strand to a thickness less than one-fifth its nominal diameter. For better assurance against slippage, the flattening should be to from 1/10 to 1/20 of the nominal diameter of the fill yarn. Even when so flattened, intervening portions of the fill yarn retain their lofty character.

Where a filter requires significant thicknesses, i.e., multiple layers of the novel fabric, this can be achieved at greater economy when the novel filtering fabric is a multi-warp fabric.

To make a diesel particulate trap, a spirally wound length or lengths of the novel filtering fabric can be stuffed into a cylindrical canister, preferably with at least one-half of the support strands extending circumferentially to provide greater assurance of completely filtering the exhaust gases. A diesel particulate trap can also be made by wrapping one or more pieces of the novel filtering fabric around each of one or more rigid, perforated hollow tubes that are constructed so as to direct gas flow through the perforations.

In a filter that employs multiple layers of the novel fabric, the support strands of adjacent layers preferably extend orthogonally to each other to minimize nesting. When two or more layers of the fabric are wound onto a substrate such as a perforated tube of a diesel particulate filter, the support strands of the innermost layer preferably extend in the circumferential direction, thus making it easier to pull that layer snugly against the substrate.

When the novel filtering fabric is to be subjected to temperatures above about 550° C., the support strands and fill yarns preferably are primarily ceramic. When the fabric is to be subjected to temperatures from about 330° to 550° C., costs can be reduced by employing support strands and fill yarns that are, for example, either hybrid ceramic/glass or special high-temperature-resistant glass such as a leached glass. When the fabric is to be subjected to temperatures not exceeding about 330° C., costs can be further reduced by employing support strands and fill yarns that are ordinary glasses.

To afford long life to the novel filtering fabric, each of the support strands and the fill yarns preferably is a continuous-filament yarn such as a continuous-filament glass or ceramic yarn. A continuous-filament ceramic yarn that has good strength and excellent resistance to temperatures above 1200° C. is a yarn of alumina-boria-silica. Such a yarn is available commercially as NEXTEL TM 312 or 440 ceramic yarn from the 3M Co.

For economy of manufacture, the novel filtering fabric preferably has a plain weave. Other useful unknotted weaves include harness weave and basket weaves.

BRIEF DESCRIPTION OF THE DRAWING

The invention may be more easily understood in reference to the drawing, all figures of which are schematic. In the drawing:

FIG. 3 is a central, longitudinal cross section through a diesel particulate trap incorporating the filtering fabric of FIGS. 1 and 2.

DESCRIPTION OF THE PREFERRED EMBODIMENTS

Figure 1:
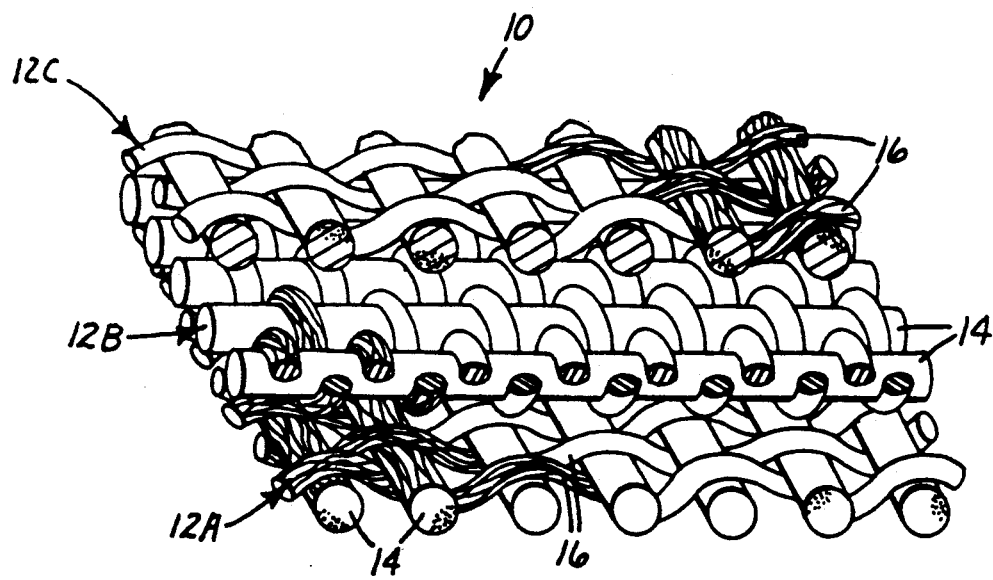
FIG. 1 is a fragmentary perspective view of a filter employing three layers of a filtering fabric of the invention.
Figure 2:
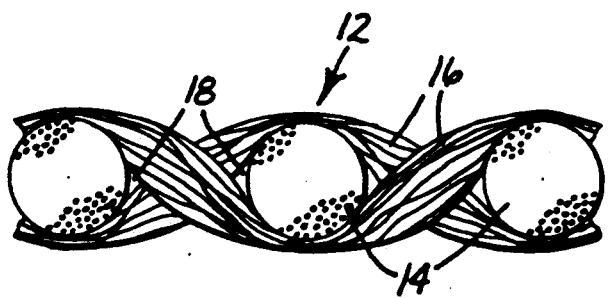
FIG. 2 is an edge view of the filtering fabric of FIG. 1.

The filter 10 of FIGS. 1 and 2 employs three layers 12A, 12B, and 12C of a plain weave filtering fabric 12. The fabric has a warp of flexible, uncrimped, substantially incompressible support yarns 14 and a weft of flexible, fully crimped fill yarns 16 that have been made lofty, for example, by being texturized. Each support yarn 14 of fabric 12 is uniformly spaced from adjacent support yarns by typically a little more than the nominal diameter of the fill yarns.

As best seen in FIG. 2, each fill yarn 16 has been pulled tightly against support yarns 14 during the weaving process so that the thickness of each fill yarn where it contacts a support yarn is about 15% of the nominal diameter of the fill yarn.

In FIG. 1, support yarns 14 of adjacent layers of fabric 12 extend orthogonally to each other to leave small pockets between those portions of fill yarns 16 that extend between support strands of each layer. FIG. 2 also shows tiny cells 18 between the fill and support yarns. Such pockets and cells can serve as traps for filtered particulate matter that can increase the length of time before an appreciable increase in back pressure signals the need for regeneration.

In FIG. 3, a diesel particulate trap 20 has an elongated metal casing 22 including a cylindrical body 23, a conical exhaust inlet 24, and a conical exhaust outlet 25. Within the cylindrical body are inner 27 and outer 29 concentric, perforated, hollow metal tubes. Inner tube 27 is blocked by an impervious circular plate 30 adjacent inlet 24, the space between the inner and outer tubes is blocked by a first impervious annular plate 32 adjacent outlet 25, and the space between the outer tube 29 and casing 22 is blocked by a second impervious annular plate 34 adjacent the inlet.

Wrapped around each of the tubes 27 and 29 to cover their perforated areas are three layers of the filtering fabric 12 of FIGS. 1 and 2. Support yarns 14 of the inner and outer fabric layers 12A and 12C, respectively, extend circumferentially, while those of the central layer 12B extend longitudinally. Part of the exhaust entering inlet 24 passes radially outwardly (arrows 36) through perforations of outer tube 29 and then through its layer of filtering fabric before exiting through the unblocked space between outer tube 29 and casing 22 adjacent outlet 25. The other part of the exhaust passes radially inwardly (arrows 38) through the layers of filtering fabric and perforations of inner tube 27 before exiting through its unblocked end.

EXAMPLE 1 a filtering fabric as illustrated in FIGS. 1 and 2 was fabricated with the support yarns as the warp. Significant features of the fabric were:

| | |
|---|---|
| support yarns 14 | continuous-filament ceramic yarns (NEXTEL TM 312) |
| construction | 1800 denier, 780 filaments, 1.5/4, 1.1 twists/cm |
| yarn diameter | 0.94 mm |
| center-to-center spacing | 3.38 mm |
| fill yarns 16 | continuous-filament ceramic yarn (NEXTEL TM 312) |
| construction | 1800 denier, 780 filaments, 2/2, 0.6 twist/cm, texturized |
| void volume | 98% |
| nominal diameter | 4.69 mm |
| thickness at support strand | 0.27 mm |
| center-to-center spacing | 2.68 mm |
| thickness of fabric 12 | 1.32 mm |

EXAMPLE 2

A diesel particulate trap was made as illustrated in FIG. 3 except having three concentric perforated tubes and five layers of the filtering fabric of Example 1 wrapped on each tube with the support yarns of the first, third and fifth layers extending circumferentially. Key features of the diesel particulate trap were:

| | |
|---|---|
| cylindrical body 23 | |
| diameter | 16.5 cm |
| length | 30.4 cm |
| concentric tubes | |
| OD of inner | 5 cm |
| OD of next | 8.9 cm |
| OD of third | 12.7 cm |
| perforations of each | circular, 0.6 cm diameter |
| openness where perforated | 65% |

This diesel particulate trap was placed in the exhaust stream of a 3.4-liter Cummins diesel engine set at the following conditions: engine 1500 rpm, hydraulic pump load 1400 psi (9600 kPa). Total run time was 139 minutes. Total soot accumulation was 17.2 g.

The particle-trapping efficiency of the mounted example was measured using multiple batch filter exhaust sampling before and after the filtering element, doing so under the filter handling procedure outlined in Code of Federal Regulations, section 86.1339-90.

| | Back pressure | Efficiency |
|---|---|---|
| Initial | 33 cm water | |
| | 63.5 cm water | 82% |

| | Back pressure | Efficiency |
|---|---|---|
| | 127 cm water | 88% |
| At 139 min. | 193 cm water | 90% |

This demonstrates the acceptability of the novel filter fabric when used in a particulate diesel filter.

EXAMPLE 3

A diesel particulate trap had four perforated cylindrical tubes, each 25.4 cm in length and 4 cm in diameter, mounted side-by-side (2×2) in a rectangular casing, 19×13 cm on its sides. Onto each tube were wrapped five layers of the filtering fabric of Example 1 with the support yarns of the first, third and fifth layers extending circumferentially. Each tube had an initial clean flow of 38 cm of water back pressure at 3.4 m$^3$/min.

This diesel particulate trap was tested as in Example 2. Total run time was 33 minutes. Total soot accumulation was 4.5 g.

| | Back pressure | Efficiency |
|---|---|---|
| | 76 cm water | 75% |
| At 33 min. | 127 cm water | 85% |

This filter configuration also demonstrates the effectiveness of the filter fabric.

EXAMPLE 4

Two filtering fabrics (Fabrics A and B) were made as in Example 1 except that the fill yarns of Fabric A had a center-to-center spacing of 2.8 mm, and those of Fabric B had a center-to-center spacing of 3.7 mm. These were used in making a diesel particulate trap as described in Example 2 except that the cylindrical body was 38.7 cm in length and 15.2 cm in diameter, and there was only one perforated tube, 5.1 cm in diameter having circular perforations, each 4 mm in diameter. The openness of the perforated portion of the tube was 63%.

The perforated portion of the tube was wrapped with one layer of an open-mesh, electrically insulating ceramic fiber fabric (1.1 mm in thickness) that had no filtering function. Over this was wrapped one layer of a punched-metal electrical resistance heater (0.45 mm in thickness).

Starting with a piece of Fabric A (50 cm in length and 38.5 cm in width) with its support yarns extending in the lengthwise direction, two pieces of Fabric B of the same size were laid side-by-side onto Fabric A with their support yarns orthogonal to those of Fabric A. The fabric B pieces were trimmed to the same dimensions to provide a second layer equal in size to that of the first. The two were then wound onto the perforated tube with the piece of Fabric A starting in contact with the electrical resistance heater and its support yarns extending circumferentially.

The resulting diesel particulate filter was tested as in Example 2 with the exhaust flowing radially outwardly through the filtering fabric.

| | Back Pressure | Efficiency |
|---|---|---|
| Initial | 53 cm of water | |
| | 127 cm of water | 89% |

After the test, the filter was electrically regenerated by energizing the resistance heater, after which the back pressure was 61 cm of water.

To keep back pressures low, each support strand can be uniformly spaced from adjacent support strands by from one to three nominal diameters of the fill yarns. At more than three nominal diameters of the fill yarns, the novel filtering fabric would tend to lack integrity. On the other hand, where better filtration is desired, each support strand can be uniformly spaced from adjacent support strands as closely as 0.1 the nominal diameter of the fill yarns.

Back pressures can also be reduced when the substantially incompressible support strands are permeable.

The support strands and/or the fill yarns can be progressively spaced more widely over a given length of the novel fabric, so that when that length is wound onto a substrate such as a perforated tube, successive convolutions can have either progressively finer or progressively larger openings, to provide gradient filtration. However, each support strand and each fill yarn preferably is parallel to other support stands and fill yarns, respectively.

When a filter employs multiple layers of the novel filtering fabric, such layers can have progressively smaller filtering openings from the upstream face of the filter toward its downstream face, thus helping to distribute trapped exhaust particles over the full depth of the filter. Such differential in relative size of openings can be accomplished in several ways in addition to the degree of texturizing of the fill yarns. For example, smaller openings can be attained by (a) packing the fill yarns closer together, (b) spacing the support yarns closer together, (c) using smaller diameter support strands and/or fill yarns, and (d) drawing the fill yarns more tightly against the support strands during manufacture of the novel filtering fabric.

When a filter is made with layers of the novel filtering fabric which have differing degrees of openness, the filter should trap a larger quantity of exhaust particles before needing to be regenerated, regardless of the sequence in which the exhaust reaches the various layers.

Yarns used as the support strand and/or as the fill yarns can include metal filaments. To permit a diesel particulate trap to be regenerated electrically, the metal filaments can afford electrical resistance heating. For a discussion of periodic burn-off of particulates accumulated in a diesel particulate trap, see European patent application, Publ. No. 0,275,372 (Gurtler et al.), laid open 3 Jan. 1990.

The presence of ceramic blown microfibers in the fill yarns can desirably increase their void volume and consequently improve the filtration efficiency of the novel filtering fabric. Useful ceramic blown microfibers include alumina-boria-silica blown microfibers that are available commercially as ULTRAFIBER TM 312 or 440 from the 3M Co. Such microfibers can also be incorporated into the support strands. Because they might involve a health hazard if blown into the atmosphere, care should be taken to prevent them from becoming dislodged, e.g., by incorporating them into continuous-filament yarns.

The void volume of the fill yarns also can be increased by incorporating heat-fugitive fibers into the fill yarns in amounts up to about 25% by volume of total fibrous material. After constructing the filtering element, the heat-fugitive fibers are burned off, either during the manufacturing process or in the first use of the novel filtering fabric. Doing so heat-sets fibers that are primarily glass or ceramic, thus allowing them to retain their shape in spite of passageways left by the heat-fugitive fibers. Such passageways additionally afford enhanced exhaust access to the filtering fibers.

Because such heat-setting stiffens glass and ceramic fibers, yarns used as the support strands can also incorporate small amounts of heat-fugitive fibers as long as the support strands remain substantially incompressible.

In addition to being useful in diesel particulate traps, the novel filtering fabric has other uses, e.g., as a baglike, tubular filter with sewn or clamped seams, or to cover a rectangular frame, as discussed in the above-cited Forester patent.

What is claimed is:

1. A fabric useful for filtering particulate matter from a stream of hot gases, which fabric comprises an unknotted weave of
   flexible, substantially incompressible, substantially uncrimped, spaced support strands and
   flexible, lofty, substantially fully crimped fill yarns which are pulled tightly against said support strands.

2. The fabric of claim 1 wherein said support strands are the warp and said fill yarns are the weft.

3. The fabric of claim 2 wherein each of said support strands is uniformly spaced from adjacent support strands by from 0.1 to 3 times the nominal diameter of said fill yarns.

4. The fabric of claim 1 wherein said support strands are yarns.

5. The fabric of claim 4 wherein said support yarns comprise from 2 to 6 intertwisted bundles of from 3 to 8 intertwisted ends.

6. The fabric of claim 5 wherein the bundles and ends have from 0.4 to 3 twists/cm in opposite directions.

7. The fabric of claim 1 wherein each of said support strands and fill yarns are primarily ceramic.

8. The fabric of claim 1 wherein said support strands and fill yarns comprise glass.

9. The fabric of claim 1 wherein said support strands or said fill yarns comprise electrically resistive material.

10. The fabric of claim 1 wherein said lofty fill yarns comprise texturized continuous-filament yarns, and loops of continuous filaments extend outwardly from the main body of each of said yarns.

11. The fabric of claim 1 wherein said lofty fill yarns have a void volume of at least about 75%.

12. The fabric of claim 1 wherein fill yarns are flattened at each support strand to less than one-fifth their nominal diameter.

13. The fabric of claim 12 wherein fill yarns are flattened to from 1/10 to 1/20 of their nominal diameter.

14. The fabric of claim 1 wherein individual ends of fill yarns have less than 2 twists/m, and their ends are twisted together at no more than one twist/cm.

15. The fabric of claim 1 wherein said weave of support strands and fill yarns have differing degrees of openness.

16. A diesel particulate trap comprising at least one rigid, perforated hollow tube that is open at one end and closed at the other, which tube is overwrapped with at least one layer of filtering fabric as defined in claim 1.

17. The diesel particulate trap of claim 16 wherein said tube is overwrapped with a plurality of layers of said filtering fabric, and said support strands of each layer extend orthogonally to those of adjacent layers.

18. The diesel particulate trap of claim 16 wherein said support strands of the inner said layer of the filtering fabric extend circumferentially.

19. A filter comprising a plurality of layers of filtering fabric as defined in claim 1 with said support yarns of each layer extending orthogonally to those of adjacent layers.

20. The filter of claim 19 wherein layers of said fabric have differing degrees of openness.

21. The filter of claim 20 wherein said layers are superimposed and convolutely wound together.

* * * * *